United States Patent
Garcia-Lucio et al.

(10) Patent No.: US 6,499,430 B2
(45) Date of Patent: Dec. 31, 2002

(54) EXTENDED HUMMINGBIRD FEEDER TUBE

(75) Inventors: Alfredo Garcia-Lucio, Denver, CO (US); Jim B. McKeever, Denver, CO (US)

(73) Assignee: Parasol, LLC, Denver, CO (US)

( * ) Notice: Subject to any disclaimer, the term of this patent is extended or adjusted under 35 U.S.C. 154(b) by 0 days.

(21) Appl. No.: 09/952,567

(22) Filed: Sep. 13, 2001

(65) Prior Publication Data

US 2002/0078897 A1 Jun. 27, 2002

Related U.S. Application Data

(63) Continuation of application No. 29/131,999, filed on Oct. 30, 2000, now Pat. No. Des. 450,892.

(51) Int. Cl.[7] .................................................. A01K 7/00
(52) U.S. Cl. ........................................................ 119/72
(58) Field of Search ............................. 119/72; 239/16, 239/17, 33

(56) References Cited

U.S. PATENT DOCUMENTS

| | | | | |
|---|---|---|---|---|
| 2,570,733 A | * | 10/1951 | Thomas | 119/72 |
| 4,037,361 A | * | 7/1977 | Murphy et al. | 239/33 |
| 5,335,851 A | * | 8/1994 | Adaska et al. | 239/33 |
| 5,395,322 A | * | 3/1995 | Moser et al. | 215/11.1 |
| 5,450,816 A | * | 9/1995 | Santa Cruz | 119/57 |
| 5,454,348 A | * | 10/1995 | Colwell et al. | 119/72 |
| 5,740,759 A | * | 4/1998 | Cummings | 119/72 |
| 5,806,460 A | * | 9/1998 | Klein | 119/72 |
| 5,924,382 A | * | 7/1999 | Shumaker | 119/72 |
| 6,056,149 A | * | 5/2000 | Murphy et al. | 215/389 |
| 6,056,206 A | * | 5/2000 | Whiton | 215/388 |
| 6,230,913 B1 | * | 5/2001 | Cornell et al. | 215/387 |

OTHER PUBLICATIONS

Heath Manufacturing Company, Catalog, Printed 7/97, pp. 1–16.
Opus, Inc., Sunswept Catalog, Printed 4/98, pp. 1–8.
Bird's Eye View, Catalog, Date unknown, pp. 1–16.
Duncraft, Bird Feeder Catalog, 1999, pp. 1–12.
Art Line, Inc., Wild Bird Feeder/Bird Baths Catalog, 1997, pp. 1–16.
Bird Stuff, Product Sheet, Date unknown, pp. 1–2.
The Hookery, 1998 and 1999 Dealer Price Lists with Inserts, pp. 1–18.
Par a Sol, 2001 Catalog, 2000, pp. 1–16.
Perky Pet Brand 1999 Catalog, pp. 19–20.
Par a Sol Catalog Dew Drop Small and Dew Drop Large.
Opus 1998–1999, p. 16.
Droll Yakees Bird Feeders, pp. 16–17.
The Backyard Airshow Catalog Briggs Associates, Inc. Leaflet.
The Birding Company, 1998 Wholesale Catalog 1998, pp. 21 and 28.

* cited by examiner

*Primary Examiner*—Charles T. Jordan
*Assistant Examiner*—John W. Zerr
(74) *Attorney, Agent, or Firm*—Sheridan Ross P.C.

(57) ABSTRACT

An extended hummingbird feeder tube is provided which has a tubular shaft length of at least about six times the length of the internal diameter of the tubular shaft, and which extends to substantially a bottom portion of an upright reservoir to facilitate efficient and effective feeding for hummingbirds. Preferably, the hanging, upright tube has an annular lip which can take the form of various flower blossoms in order to replicate the external and internal characteristics of a typical flower.

24 Claims, 1 Drawing Sheet

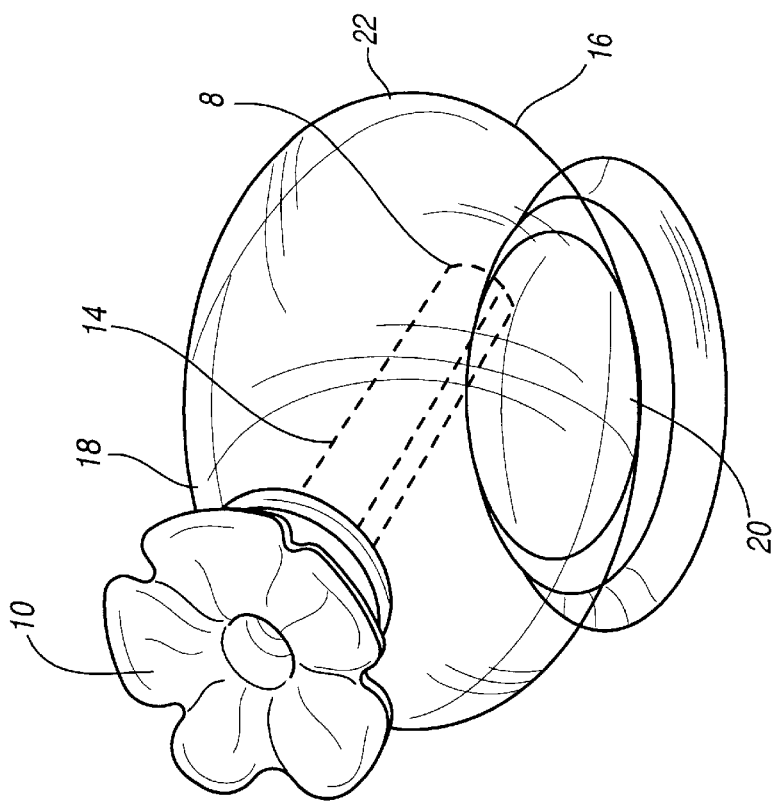
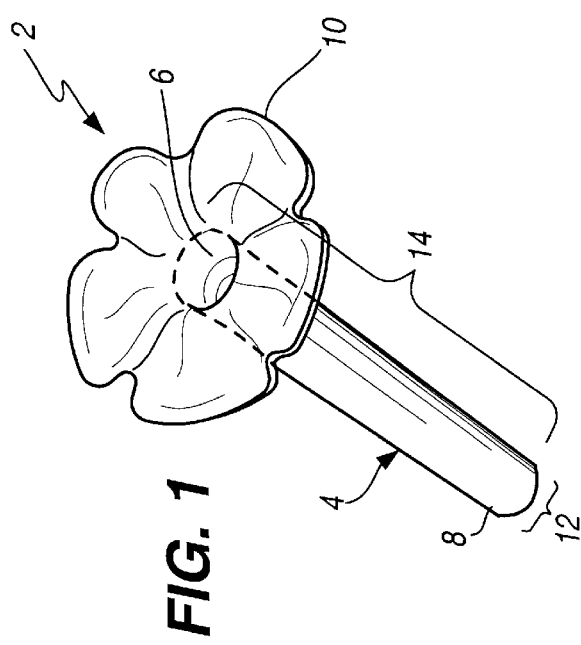
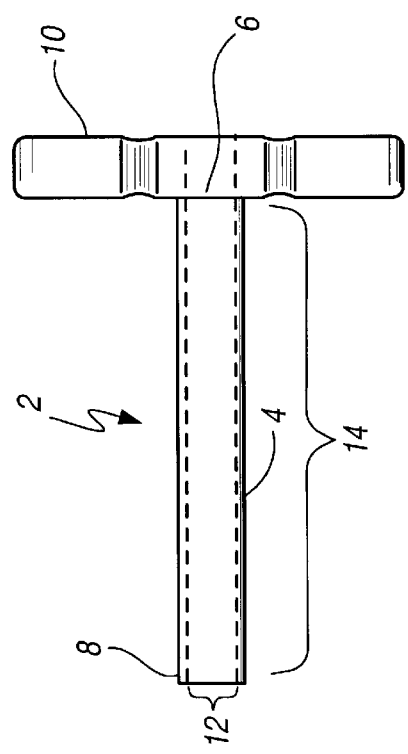

EXTENDED HUMMINGBIRD FEEDER TUBE

CROSS-REFERENCE TO RELATED APPLICATIONS

This is a Continuation application of and claims priority from pending U.S. Design Patent Application, Ser. No. 29/131,999, filed Oct. 30, 2000, now U.S. Pat. No. D450892 entitled "RESERVOIR FOR A HUMMINGBIRD FEEDER" which is herein incorporated by reference in its entirety.

FIELD OF THE INVENTION

The present invention relates to hummingbird feeders, and more specifically to an extended hummingbird feeder tube adapted for use with an upright reservoir.

BACKGROUND OF THE INVENTION

Hummingbirds have a fast breathing rate, a fast heartbeat, and a high body temperature. As a result, they must feed every ten minutes or so throughout the day, and consume as much as two-thirds of their total body weight in a single day. While they eat both nectar and insects, about a third of a hummingbird's diet is sugar, which is obtained from flower nectar and tree sap.

Hummingbirds have bills that are long and tapered, perfectly suited for probing into the center of tubular flowers, such as trumpet vines, for the nectar. A hummingbird's tongue is approximately one and one-half times the length of its bill, tube-like in nature, and is used to dart deep into the flowers for nectar, taking up liquid by a capillary action.

Various hummingbird feeders are known in the industry which attempt to replicate the flower feeding experience for a hummingbird. Feeders are made which hang vertically with feeder tubes extending downward. Other feeders are comprised of horizontal, hanging reservoirs with feeding tubes emanating therefrom. These feeding tubes often replicate flower blossoms and are colored in nature in order to attract the hummingbirds.

Three problems exist, however, with traditional feeding tubes. First, the tubes, as currently known in the art, do not replicate or encourage a true feeding experience for hummingbirds. The stem of a typical feeding tube does not extend for the full length of a hummingbird's bill. The proportional dimension of the feeding tube diameter and length are not realistic. Consequently, when a hummingbird places its bill in such a stem, its tongue extends well beyond the stem, thereby negating the capillary action of the tongue and failing to replicate the sensation of feeding from a flower. As a result, these types of feeding tubes are not as effective for encouraging the feeding of hummingbirds.

Second, due to the shortness of the stem, the feeder becomes ineffective once the fluid contained therein falls below the bottom of the stem. When this happens, a hummingbird inserts its tongue past the stem and makes contact with air rather than fluid. As a result, the hummingbird believes that there is no more "nectar" in the feeder and leaves, even though this is not the case. The remaining fluid is wasted, based on non-use. While feeding tubes exist that are longer in nature, they typically are used in conjunction with downward-facing hummingbird feeders and are not inserted into the reservoir itself, but rather are suspended from the orifice of the reservoir. This configuration does not pose the problem of having fluid go unused because gravity continually draws fluid into the tube. However, leaking and the attraction of annoying insects such as wasps, bees, and ants are problematic with this type of inverted feeder tube.

Third, because typical feeder tubes do not substantially extend into the feeder reservoir, insects with short tongues, such as bees, are encouraged to feed on the "nectar," thereby depleting the amount left for hummingbirds. A narrower, longer tube would discourage these insects from attempting to steal "nectar" from these feeders.

Thus, there is a need for an extended hummingbird feeder tube which is of sufficient length and a proportional internal diameter so that it replicates a tubular flower feeding experience while also discouraging insects and maximizing the use of the fluid contained in the feeder.

SUMMARY OF THE INVENTION

It is thus one aspect of the present invention to provide a more realistic feeding tube adapted for use with a hummingbird feeding reservoir in order to encourage more hummingbird feeding activity. It is a further aspect of the present invention to provide a hummingbird feeding tube which efficiently utilizes the fluid contained in an upright reservoir.

Thus, in one embodiment of the present invention a hummingbird feeding tube is comprised of a tube with an annular lip in the shape of a blossom, whereby the length of the stem extends substantially to the bottom of the upright reservoir and is at least about six times as long as the internal diameter of the feeding tube. This configuration more closely replicates a hummingbird's feeding experience with a trumpet vine blossom—a hummingbird favorite. Due to a hummingbird's ability to extend its tongue well beyond its bill, it is critical that the tongue be given the proper receptor in order to facilitate its capillary action. Shorter versions of the feeding tube allow a hummingbird's tongue to wander freely, which negates this capillary action, thereby impeding a hummingbird's ability to feed. By extending the length of the feeding tube, it assures that the majority of the fluid in the reservoir is accessible by the hummingbird.

Accordingly, in one aspect of the present invention, a feeder tube adapted for use with an upright hummingbird feeding reservoir with an aperture for receiving said feeder tube is provided, comprising:

(a) a tube having an internal diameter and a length defined by an upper end and a lower end, wherein said length of said tube is at least about six times the dimension of said internal diameter and extends to substantially a lowermost portion of the reservoir; and (b) an annular lip integrally interconnected to said upper end of said tube and having a second diameter greater than an external diameter of said upright hummingbird feeding reservoir aperture.

BRIEF DESCRIPTION OF THE DRAWINGS

FIG. 1 is an isometric perspective view of an extended hummingbird feeder tube;

FIG. 2 is a side elevation view of the extended hummingbird feeder tube illustrated in FIG. 1; and FIG. 3 is an isometric perspective view of the extended hummingbird feeder tube as adapted for use with an upright hummingbird feeder reservoir.

DETAILED DESCRIPTION

Referring now to the drawings, FIG. 1 is an isometric perspective view of one embodiment of an extended hummingbird feeder tube. The feeding tube 2 is generally comprised of a tubular shaft 4, which has an upper end 6 and a lower end 8 which defines the longitudinal shape of the feeding tube 2 and a substantially consistent internal diameter extending from the upper end 6 to the lower end 8. The upper end of the tubular shaft 6 is further comprised of an annular lip 10 which may be shaped like a flower blossom.

In order to replicate the natural experience of feeding from a tubular flower, the length of the tubular shaft 14 is at least about six times as long as the diameter of the tubular shaft 12. This ratio ensures that the hummingbird's tongue has sufficient structure to guide it throughout the feeding process, thereby facilitating its capillary action. In a preferred embodiment of the present invention, the internal diameter of the tubular shaft 12 has a dimension of about ¼ inch, while the length of the tubular shaft 14 has a dimension of between about 1½ and 2 inches.

In one embodiment of the present invention, the annular lip 10 of the tubular shaft 4 is shaped in the form of a blossom in order to replicate a flower. By varying the color and shape of the annular lip 10, different types of flowers can be replicated. It is preferable, however, that the shape be that of the trumpet vine blossom—a five petal blossom—which is a favorite of most species of hummingbirds. The feeding tube 2 can be made out of a variety of materials, such as glass, plastic, or various compositions of resin well known in the art. While preferably red in color, the feeding tube 2 and associated blossom can be various colors in order to replicate different flower blossoms.

An upright reservoir may be provided in combination with the feeding tube of the present invention and which generally comprises a top end, bottom end, and opposing lateral edges positioned therebetween. As appreciated by one skilled in the art, the lateral edges may comprise a substantially oval or round shape as shown in FIG. 3.

An upright reservoir 16 may be provided in combination with the feeding tube of the present invention and which generally comprises a top end 18, bottom end 20, and opposing lateral edges 22 positioned therebetween. As appreciated by one skilled in the art, the lateral edges may comprise a substantially oval or round shape as shown in FIG. 3.

The reservoir 16 is filled with a fluid selected to feed hummingbirds. The lower end of the tubular shaft 8 is then inserted in the aperture provided in the reservoir 16. The aperture preferably has a smaller diameter than that of the annular lip 10 such that when the tube is fully inserted, the annular lip 10 will rest against the outside edge of the aperture. Thus, the feeding tube 2 is supported by the annular lip 10 and the lower end of the feeding tube 8 substantially extends into the reservoir 16.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

The following components and numbers associated thereto are provided for clarity purposes:

| # | Component |
|---|---|
| 2 | Extended hummingbird feeder tube |
| 4 | Tubular shaft |
| 6 | Upper end of tubular shaft |
| 8 | Lower end of tubular shaft |
| 10 | Annular lip |
| 12 | Diameter of tubular shaft |
| 14 | Length of tubular shaft |
| 16 | One embodiment of hummingbird feeder reservoir |

What is claimed is:

1. A hummingbird feeder comprising:
    an upright reservoir with an aperture positioned proximate to an upper end;
    b) a feeder tube having an internal diameter and a length defined by an upper end and a lower end, said length at least about six times the dimension of said internal diameter of said tube, wherein said tube exam into the upright hummingbird feeding reservoir, and
    c) an open ended, blossom shaped annular lip with a plurality of petals integrally interconnected to and substantially flush to said upper end of said feeder tube and having a second diameter greater than said upright reservoir aperture, wherein said open ended, blossom shaped annular lip is adapted to receive a hummingbird's tongue in an unrestricted manner.

2. The apparatus of claim 1, wherein said tube and said annular lip are comprised of glass.

3. The apparatus of claim 1, wherein said tube and said annular lip are comprised of plastic.

4. The apparatus of claim 1, wherein said annular lip has a geometric shape with five petals to imitate a flower.

5. The hummingbird feeder of claim 1, wherein said lower end of said feeder tube extends substantially into a lowermost portion of said hummingbird feeding reservoir.

6. An upright hummingbird feeder, comprising:
    (a) a tube having a length defined by an upper end and a lower end, said length of said tube being at least about six times the dimension of an internal diameter of said tube;
    (b) an open ended, annular lip with a plurality of petals integrally interconnected to and positioned substantially adjacent to said upper end of said tube which is adapted to receive in an unrestricted manner a tongue of a hummingbird; and
    (c) an upright reservoir for holding a liquid which is defined by a top end and a bottom end and opposing lateral edges positioned therebetween, wherein said top end of said reservoir has an aperture adapted to receive said tube, said aperture being smaller than said annular lip, wherein said tube is suspended on said upright reservoir and extends into said upright reservoir.

7. The apparatus of claim 6, wherein said tube and said annular lip are comprised of glass.

8. The apparatus of claim 6, wherein said tube and said annular lip are comprised of plastic.

9. The apparatus of claim 6, wherein said annular lip has a geometric configuration with at least about five petals, wherein said annular lip resembles a flower blossom.

10. The apparatus of claim 6, wherein said upright reservoir is comprised of glass.

11. The apparatus of claim 6, wherein said upright reservoir is comprised of plastic.

12. The hummingbird feeder of claim 6, wherein said lower end of said feeder tube extends substantially into a lowermost portion of said hummingbird feeding resevoir.

13. An upright hummingbird feeder, comprising:
(a) a feeding tube having an internal diameter and a length defined by upper end and a lower end, said length of said feeding tube being at least about six times the dimension of said internal diameter of said feeding tube;
(b) an upright reservoir for holding a liquid which is defined by a base, a top, and a plurality of sidewalls connected therebetween, and an aperture positioned proximate to said top for receiving said feeding tube; and
(c) an open ended, blossom-shaped annular lip with a plurality of petals integrally interconnected to said upper end of said feeding tube which is adapted to receive a hummingbirds tongue in an unrestricted manner, said blossom-shaped annular lip positioned substantially flush to said upper end of said feeding tube and having an external diameter greater than a diameter of said aperture of said upright reservoir, wherein said lower end of said feeding tube extends into said upright reservoir.

14. The apparatus of claim 13, wherein said feeding tube and said blossom-shaped annular lip are comprised of glass.

15. The apparatus of claim 13, wherein said feeding tube and said blossom-shaped annular lip are comprised of plastic.

16. The apparatus of claim 13, wherein said blossom-shaped annular lip is further comprised of at least three petals.

17. The apparatus of claim 13, wherein said upright reservoir is comprised of glass.

18. The apparatus of claim 13, wherein said upright reservoir is comprised of plastic.

19. The hummingbird feeder of claim 13, wherein said lower end of said feeder tube extends substantially into a lowermost portion of sad hummingbird feeding reservoir.

20. A hummingbird feeder, comprising:
a) an upright reservoir with an aperture positioned proximate to an upper end;
b) a tube having an internal diameter and a length defined by an upper end and a lower end, said length of said tube being at least about six times the dimension of said internal diameter of said tube and said lower end of said tube extending into said upright reservoir; and
(c) an open ended annular lip with a plurality of petals interconnected to and substantially juxtaposed with said upper end of said tube having a second diameter greater than external diameter of said upright hummingbird feeding reservoir aperture, wherein said open ended annular lip and said internal diameter of said tube are adapted to receive a hummingbird's tongue in an unrestricted manner.

21. The apparatus of claim 20, wherein said tube and said annular lip are comprised of glass.

22. The apparatus of claim 20, wherein said tube and said annular lip are comprised of plastic.

23. The apparatus of claim 20, wherein said annular lip has a geometric configuration which resembles a flower blossom.

24. The hummingbird feeder of claim 20, wherein sad lower end of said feeder tube extends substantially into a lowermost portion of said hummingbird feeding reservoir.

* * * * *

UNITED STATES PATENT AND TRADEMARK OFFICE
CERTIFICATE OF CORRECTION

PATENT NO.     : 6,499,430 B2                                        Page 1 of 1
DATED          : December 31, 2002
INVENTOR(S)    : Garcia-Lucio et al.

It is certified that error appears in the above-identified patent and that said Letters Patent is hereby corrected as shown below:

Column 4,
Line 13, replace "an upright" with -- a) an upright --.
Line 18, replace "exam" with -- extends --.

Column 6,
Line 29, replace "sad" with -- said --.

Signed and Sealed this

Twenty-fifth Day of March, 2003

JAMES E. ROGAN
*Director of the United States Patent and Trademark Office*